March 10, 1959  L. G. BOSTWICK ET AL  2,877,319
ELECTROMECHANICAL VIBRATOR

Filed May 17, 1956

INVENTORS L. G. BOSTWICK
R. L. GUNCELLE
BY
ATTORNEY

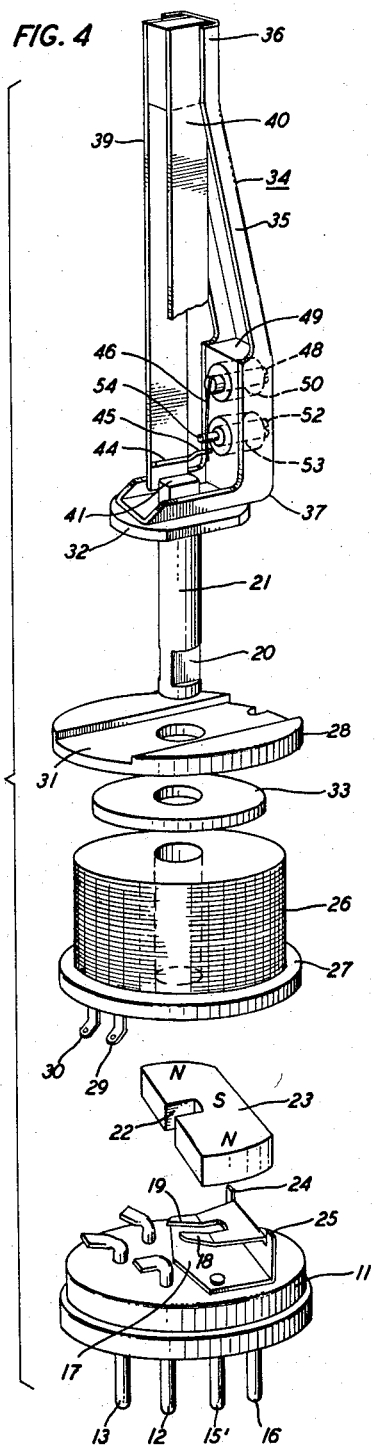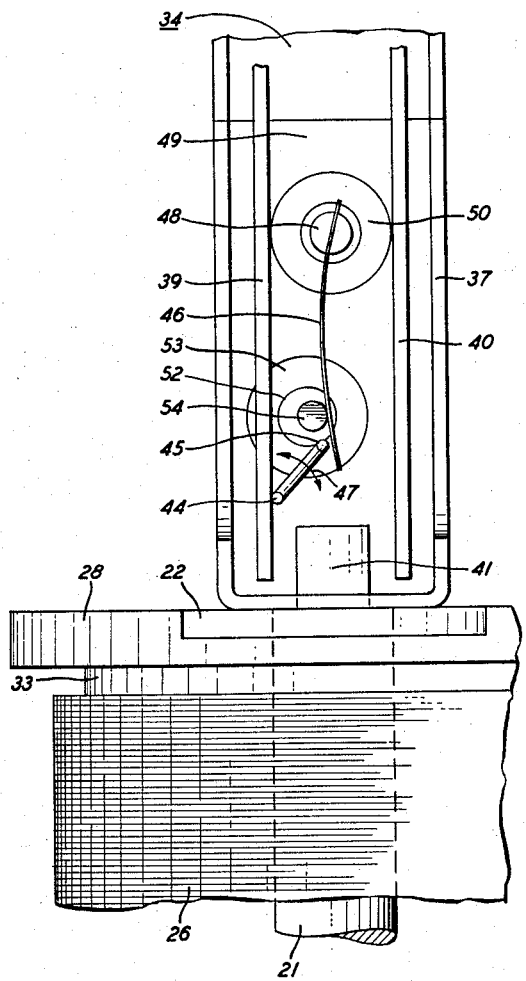
INVENTORS L. G. BOSTWICK
R. L. GUNCELLE
BY
ATTORNEY

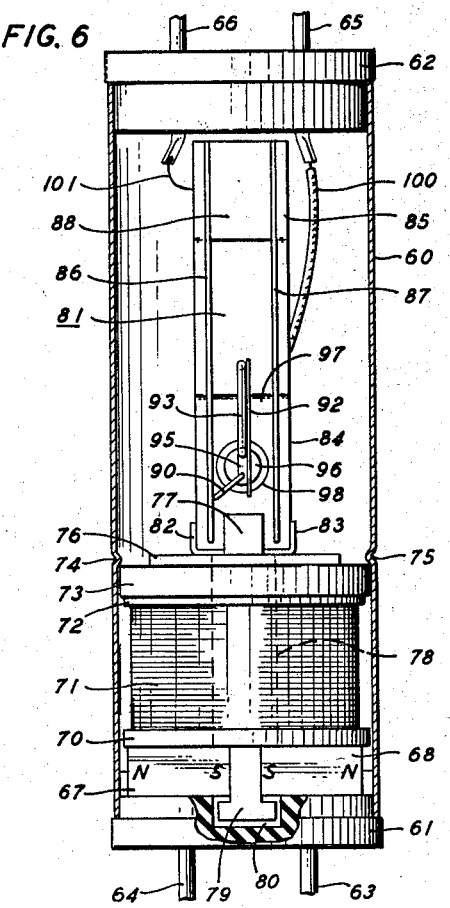

United States Patent Office

2,877,319
Patented Mar. 10, 1959

2,877,319

ELECTROMECHANICAL VIBRATOR

Lee G. Bostwick, Florham Park, N. J., and Robert L. Guncelle, Cambria Heights, N. Y., assignors to Bell Telephone Laboratories, Incorporated, New York, N. Y., a corporation of New York Application May 17, 1956, Serial No. 585,533

16 Claims. (Cl. 200—90)

This invention relates to vibrating devices and more particularly to devices including a magnetically driven vibrating reed.

Vibrating reeds have been found to be well suited for use as selectors in mobile radio receiver systems and in other apparatus wherein it is desirable to selectively close circuits by means of the vibrating contacts of these devices for the purpose of actuating a bell or other call-indicating mechanism or for performing some other circuit function.

It has been found desirable to employ a group of these selectors, for example, three in number for this purpose, and to impart a particular resonance to each selector so that all of the reeds in the group will respond to a predetermined combination of three frequencies. In one system, thirty frequencies, 15 cycles apart in the band from 500 to 1000 cycles, are employed, each individual receiver having three vibrating reed selectors which are tuned to one or more of the thirty frequencies.

Because of the close frequency spacing employed in a system of the above type, it is necessary to design each individual selector so that it will respond substantially to its intended resonance frequency and to no other. The wide ambient temperature range over which these systems are operated has further complicated this problem in the past because the resonance frequency of a given selector is materially affected by the thermoelastic, thermoexpansive and thermomagnetic properties of the vibrating reed, or reeds, and of other parts of the selector. It has been found desirable to limit resonance frequency variations to a small fraction of a cycle over a temperature range as wide as —40° C. to 85° C.

Heretofore, when a vibrating device of this type was operated, vibrations were occasionally induced in the frame of the device and these vibrations tended to oscillate at or near the resonance frequency of the reeds with a resulting adverse effect on the frequency stability thereof. Also, primarily because of the close tolerances that are necessary in the selector structure to achieve a resonance frequency within the desired range, it has been difficult to accurately adjust the device after assembly. In addition, devices of this class have not been sufficiently sensitive to operate effectively at the designated frequency.

One general object of this invention is to improve vibrating devices of the type, including a vibrating reed.

More specifically, it is an object of this invention to stabilize the resonance frequency of a magnetically driven vibrating reed device to facilitate adjustment thereof, and to increase the sensitivity of and reduce the power requisite for operation of such devices.

Additional objects of this invention are to facilitate the fabrication of vibrating devices of the type referred to above and to simplify the structure and reduce the size of circuit controlling devices capable of responding to a predetermined frequency.

In one illustrative embodiment of this invention, a vibratory device comprises a pair of vibratile reeds or tines supported by a frame member, a flexible contact member in operative relationship to the tines wherein both the flexibility and the spacing of this member may be controlled by means of adjusting studs, and a magnetic structure including an elongated permanent magnet that extends in a direction which is substantially perpendicular to the longitudinal direction of the tines.

In another illustrative embodiment of this invention, one of the adjusting studs is replaced by a flexible loop which is used to control the amount of flexibility in the contact member.

In accordance with one feature of this invention, the frame member is designed so that it is relatively flexible to bending in a direction that is perpendicular to the flexing plane of the tines and this frame member is also flexible in torsion. The flexibility perpendicular to the flexing plane of the tines and the torsional flexibility are made sufficiently high so that any resonances set up in these modes of vibration have natural frequencies substantially below the resonant frequency of the tines. Consequently, at the operate frequency of the tines, little or no vibration will be transferred to the frame and to the rest of the structure.

More specifically, in accordance with this feature of the invention, the end portions of the frame member are arranged in different parallel planes parallel to the flexing plane of the tines. This construction will impart considerable flexibility to the frame member and will enable this member to pass low frequency vibrations while remaining relatively free from vibration at or near the resonance frequency of the tines.

In accordance with another feature of this invention, the aforementioned frame member has thereadjacent a flexible contact which is adapted to mate with a corresponding contact on one of the tines. The gap between these contacts may be readily adjusted by means of an adjusting stud and, in addition, means are provided for varying the amount of flexibility in the flexible contact member.

In accordance with a further feature of this invention, the permanent magnet is mounted in a direction that is substantially perpendicular to the longitudinal direction of the tines and the ends of this magnet are of the same polarity and are positioned in proximity to the inner wall of a cylindrical magnetic cover. The center portion of the permanent magnet is of opposite polarity to the ends and engages one end of an elongated core member, the central axis of which lies along the axis of the cover. The other end of the core member is positioned to set up a magnetic field through the reeds and the cover. This coaxial construction confines the magnetic field largely within the cover where it is but slightly affected by spurious external magnetic fields. Furthermore, because of the close contact between the permanent magnet and the remainder of the magnetic circuit, the reluctance thereof remains at a low value and is only insignificantly affected by dimensional changes caused by variations in temperature.

The above-noted and other objects and features of this invention will be understood more clearly and fully from the following detailed description, when read in conjunction with the accompanying drawings in which:

Fig. 4 is an exploded perspective view of the device illustrated in Fig. 1 with the cover removed and with one of the fork tines partially broken away;

Fig. 5 is an enlarged detail view of a portion of the device illustrated in Fig. 1;

Fig. 6 is a front elevational view, partially in cross section, of a vibrating reed device illustrative of another embodiment of this invention;

Fig. 7 is a side elevational view, partially in cross section, of the device illustrated in Fig. 6 with one of the fork tines partially broken away;

Fig. 8 is a view in cross section of the device taken on the line 8—8 of Fig. 7; and Fig. 9 is an enlarged detail view of a portion of the device illustrated in Fig. 6 after an adjustment has been made.

Figure 1:
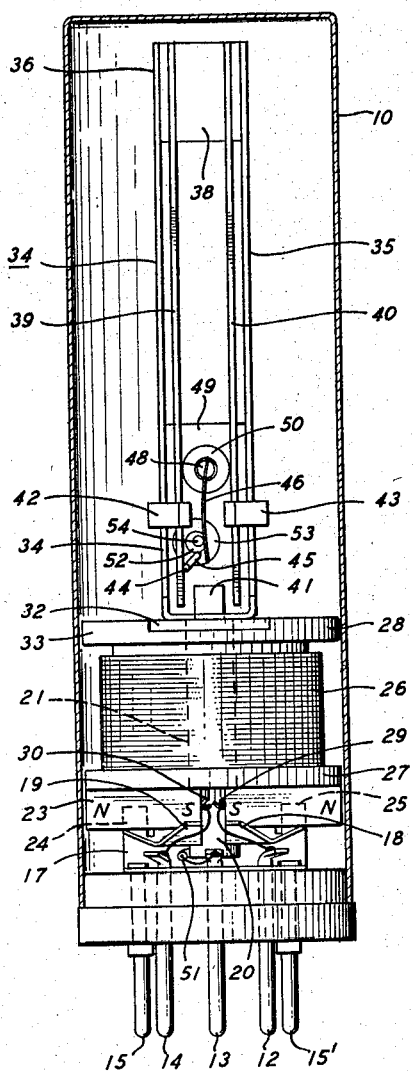
Fig. 1 is a front elevational view of a vibrating reed device illustrative of one embodiment of this invention with the cover shown in cross section.
Figure 2:
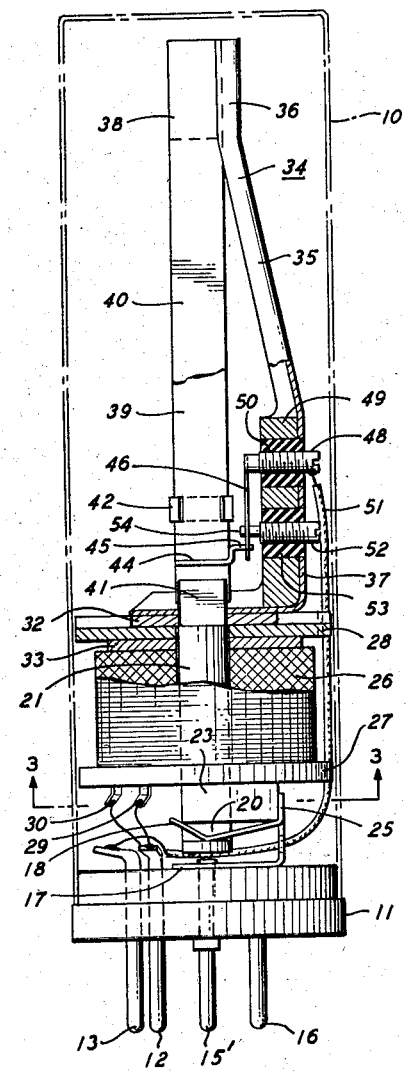
Fig. 2 is a side elevational view, partly in cross section, of the device illustrated in Fig. 1 with one of the fork tines partially broken away.
Figure 3:
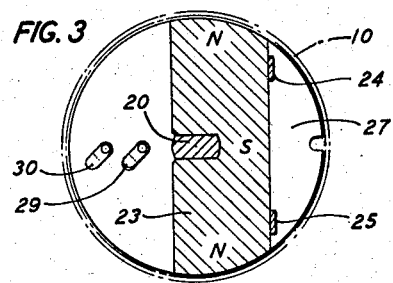
Fig. 3 is a view in cross section of a portion of the device taken on the line 3—3 of Fig. 2.

Referring now to Figs. 1 and 2 of the drawings, there is shown a preferred structure and assembly of the invention. The elements of the vibrating device are enclosed in a cover 10 made preferably from a magnetic material. The cover 10 is supported endwise on a plastic or other insulating plug 11 in which are insulatedly supported pin-type terminals 12, 13, 14, 15, 15' and 16, portions of which project downwardly from the plug 11. Terminals 12, 13, 14, 15 and 15' comprise the electrical connections of the device, while terminal 16 is used to provide additional structural support and to adapt the device for insertion into a standard socket.

As shown in Fig. 4, a clip 17 is secured to the upper surface of the plug 11 and is fastened in electrically conductive relation to the terminals 15 and 15'. The clip 17 has two horizontally extending arms 18 and 19 which accommodate a lower recessed portion 20 of a core member 21. The recessed portion 20 is also adapted to mate with an elongated slot 22 in a horizontally extending permanent magnet 23 which is positioned on the clip arms 18 and 19 and which is further held in position by two vertically extending projections 24 and 25 on the clip 17. The permanent magnet 23 may be constructed from a single piece of magnetically retentive material with its end portions of like polarity and with its central area of the opposite polarity, but it will be apparent that this construction may be varied by aligning two permanent magnets with like poles adjacent each other to fulfill a similar function. Other equivalent structures will suggest themselves to those skilled in the art.

An energizing winding 26 surrounds the core member 21 and is held in position by non-magnetic support members 27 and 28, and these support members may also serve as guides to axially align the winding 26 and the core member 21 inside the cover 10. The support member 27 rests on the upper surface of the permanent magnet 23 and has coil terminals 29 and 30 thereon which are connected to the pin-type terminals 12 and 14, respectively, as shown in Fig. 1. The support member 28 has a recess 31 therein (Fig. 4) which is adapted to mate with a metallic plate 32. Eddy-current damping washers, such as the copper damping washer 33, may be positioned adjacent the winding 26, but it will be apparent that these washers are not essential for successful operation of the invention.

Rigidly supported by the plate 32 is a metallic frame member 34 which has a central portion 35 and two end portions 36 and 37. These end portions are arranged in parallel vertical planes so that the frame member 34 will be relatively flexible to bending in a direction perpendicular to the end portions 36 and 37. In the illustrated embodiment the frame member has been provided with a channel-shaped cross section to increase its rigidity in a direction parallel to the direction of the planes of the end portions 36 and 37, but for most applications, the desired rigidity can be obtained without the necessity for a frame member cross section of this configuration. The end portion 36 of the frame member 34 has a metallic spacer block 38 secured thereto which supports two fork tines 39 and 40 in electrically conducting relation to said frame member 34. In the illustrated embodiment, the frame member 34, the spacer block 38 and the tines 39 and 40 have been soldered together to provide a rigid mounting, but it will be apparent that clamps, rivets, etc., may also be used to hold these parts in proper relation to each other. The tines 39 and 40 are vertically aligned in parallel planes and the lower ends thereof are in spaced proximity to a pole-piece portion 41 of the core member 21. Sliding weights 42 and 43 may be positioned on the tines 39 and 40 in order to provide adjustment of the frequency at which the tines will vibrate.

To insure that tines 39 and 40 will vibrate at their proper frequency with little deviation, it is important that these tines be driven in phase toward and away from the pole-piece portion 41 in a symmetrical mode and that forces tending to drive the tines in other modes be avoided. Unsymmetrical forces may be set up by torsional and flexural resonances in the frame, whereby the relative size of the magnetic gap between each tine and the pole-piece may be altered or the base of the fork moved in a direction such that its motion may affect one tine differently than the other. These frame oscillations have been prominent in previous devices of this type and have resulted in adverse effects on the resonance frequency and other operating characteristics of these devices.

In the present invention, the adverse effects of these frame resonances or oscillations have been substantially eliminated and this is due in large measure to the particular design of the frame member 34 described above. This frame member has considered rigidity in a direction perpendicular to the plane of the tines 39 and 40, while in other planes and in torsion the frame member is relatively flexible. As a result, frame resonances in torsion and in the flexible direction are substantially lower in frequency than the resonance frequency of the tines. Consequently, frame resonances will not appreciably affect the tine vibration and a much more stable device results.

As shown in Fig. 5, the vibrating tine 39 has secured thereto a first contact 44 which is preferably held in position by spot welding, solder or other bonding means. The contact 44 has an offset portion 45 which is adapted to engage a second contact 46 when the tine 39 is vibrated as hereinafter described. By bending the offset portion 45 as indicated by the arrow 47, a rough adjustment of the gap between the contact 44 and the contact 46 can be made. These contacts are preferably fabricated from a small diameter rhodium wire, but it will be apparent that any material may be used that has the desired electrical and mechanical properties.

The contact 46 is rigidly affixed at one end thereof to a first adjusting stud 48 which is mounted in a support block 49 and is held in insulated relation thereto by means of an insulating bushing 50. As shown in Fig. 2, the adjusting stud 48 is connected to the terminal 13 by a wire 51, so that an electrically conductive path is formed from the contact 46, through the adjusting stud 48 and the wire 51, to the terminal 13.

Also supported by the block 49 is a second adjusting stud 52 which is held in insulated relation to the block 49 by means of an insulating bushing 53. The stud 52 has an offset cam portion 54 on the inner end thereof, and this cam portion rests against the contact 46 at a point intermediate its ends. Consequently, when the adjusting stud 52 is rotated, the cam portion 54 will cause the lower end of the contact 46 to move in proximity to the offset portion 45 of the contact 44. Furthermore, by rotating the adjusting stud 48, the pressure exerted between the contact 46 and the cam portion 54 may be either increased or decreased. Since the contact 46 has sufficient flexibility to give or yield slightly when engaged by the contact 44, rotation of the stud 48 will permit an extremely fine adjustment of this yielding engagement.

From the above, it will be apparent that the various operating characteristics of this embodiment of the invention may be easily changed to conform with the requirements of a given circuit or apparatus. By rotating the stud 48, the yielding force exerted between the contact 46 and the contact 44 when the tines vibrate can be readily altered, thereby permitting a very fine adjustment that enables the contact 46 to be maintained relatively free from chatter without upsetting the motion of the tines. By rotating the stud 52, the contact gap between the contact 44 and the contact 46 may also be changed to provide a control of the sensitivity, speed of operation and other characteristics of the vibrator. The above adjustments may be made accurately and easily, after the device is assembled, by means of a screwdriver or other tool which is adapted to rotate the studs 48 and 52.

Other details will be understood from the following description of the mode of operation of this embodiment of the invention.

When the device is in its unoperated position, a magnetic flux is created by the permanent magnet 23 which follows a path from the ends of the magnet 23, through the cover 10, across the space between the cover 10 and the fork tines 39 and 40, down the tines 39 and 40, across the pole-face gap between the tines 39 and 40 to the pole-piece portion 41 of the core member 21, and then down the core member 21 to the central portion of the permanent magnet 23. This permanent magnetic flux creates a force across the pole-face gap between the tines 39 and 40 and the pole-piece portion 41 which will tend to bend the tines 39 and 40 inward toward the pole-piece portion 41; however, the flux is not strong enough by itself to produce any appreciable movement. Because of the intimate physical relationship between the permanent magnet 23 and the remainder of the magnetic circuit, it will be apparent that the magnetic reluctance of the magnetic path remains at a low value and any changes in this reluctance caused by dimensional changes due to the adverse effects of temperature will be insignificant. Consequently, the operating characteristics of the over-all device are extremely stable over a wide temperature range.

Upon the application of an energizing current of suitable frequency to the pin-type terminals 12 and 14, an electromagnetic flux will be produced by the winding 26 which will aid the permanent magnetic flux during one-half cycle and will oppose the permanent magnetic flux during the other half cycle. The electromagnetic flux follows a path first in one direction and then in the other from the lower end of the core member 21, along the permanent magnet 23 to the cover 10, across the space between the cover 10 and the fork tines 39 and 40, down the tines 39 and 40, and then across the pole-face gap to the pole-piece portion 41 of the core member 21.

The combined effect of the forces created by the permanent magnetic flux and the electromagnetic flux on the tines 39 and 40 will cause the contacts 44 and 46 to come in contact with each other when these fluxes are aiding, thereby momentarily closing an electrical circuit, and to disengage from contact with each other when these fluxes are opposed, thereby reopening the circuit. The resulting momentary circuit follows a path from the terminal 13, along the wire 51 to the stud 48 and the contact 46, from the contact 46 to the contact 44, from the contact 44 to the tine 39, along the tine 39 and the frame member 34 to the plate 32 and the pole-piece portion 41 of the core member 21, down the core member 21 to the clip 17 and then through the clip 17 to the terminal pins 15 and 15'. When the current in the winding 26 is removed, the tines 39 and 40 will return to their initial disengaged position.

With reference to Figs. 6 through 9 of the drawings, it will be observed that, except for the elements involved in the adjustment of the embodiment of the invention disclosed therein, the structural features of this embodiment are for the most part substantial equivalents of the embodiment of the invention disclosed in Figs. 1 through 5. The structural configuration of certain of these features has been altered slightly to indicate different designs that are common to both of the disclosed embodiments, but it should by no means be inferred that these altered features are restricted to the second disclosed embodiment alone. Because of these structural alternations, similar parts of the two groups of figures are given different numerical designations; however, their interchangeability will be readily apparent to those skilled in the art.

The elements of the vibrating device illustrative of the second disclosed embodiment are enclosed in a cover 60, which is similar in most respects to the cover 10 of Fig. 1 except that the cover 60 has an opening at each end thereof. The ends of the cover 60 are closed by means of insulating plugs 61 and 62 in which are insulatedly supported pin-type terminals 63, 64, 65 and 66. The terminals 63 and 64 are supported by the plug 61 and function as the winding terminals of the device, while the terminals 65 and 66 are supported by the plug 62 and act as contact terminals.

Positioned in an elongated recess in the plug 61 are permanent magnets 67 and 68, which fulfill a function similar to that of the permanent magnet 23 in the embodiment of the invention disclosed in Fig. 1. As shown in Fig. 8, the magnets 67 and 68 may be soldered or otherwise affixed to a strip 69 of preferably non-magnetic material, but the strip 69 may readily be omitted without departing from the spirit or scope of the invention. The permanent magnets 67 and 68 support an insulating support member 70, a winding 71, an eddy-current damping washer 72 and another insulating support member 73, and these parts may be held in rigid relation to the remainder of the device by means of the crimped portions 74 and 75 of the cover 60 (Fig. 6).

A metallic plate 76 is positioned on the upper surface of the support member 73 and this plate is rigidly affixed to a pole-piece portion 77 of a core member 78. The core member 78 is attached to and suspended from the plate 76 so that the lower portion 79 of the core member 78 is adapted to fit loosely in the opening 80 in the plug 61. In addition, recesses have been provided in the lower portion 79 of the core member 78 to accommodate the adjacent faces of the permanent magnets 67 and 68.

As shown in Fig. 7, a frame member 81 is rigidly secured to the plate 76 by means of spot welding, solder or other bonding means. The frame member 81 has two flange portions 82 and 83 at the lower end thereof and in addition has two end portions 84 and 85 which are positioned in different parallel planes perpendicular to the planes of fork tines 86 and 87. The end portion 85 is electrically connected to the terminal 66 by means of the wire 101. The fork tines 86 and 87 are secured on either side of a spacer block 88 and this block is soldered or otherwise affixed to the end portion 85 of the frame member 81. The lower ends of the tines 86 and 87 are positioned in close proximity to the pole-piece portion 77 of the core member 78.

One leg 89 of a U-shaped first contact 90 is secured to the vibrating tine 86 by welding, soldering or other bonding means. The other leg 91 of the U-shaped contact 90 is adapted to engage a second contact 92 when the tine 86 is vibrated. By bending the leg 91 of the contact 90, a rough adjustment of the gap between the contact 90 and the contact 92 can be made in a manner similar to that shown and described in the first disclosed embodiment of the invention.

The contact 92 is rigidly affixed at one end thereof to a curved portion of a flexible loop 93. One end 94 of the loop 93 is preferably straight and is positioned so that it rests against the center portion of the contact 92. The other end 95 of the loop 93 is rigidly secured to an adjusting stud 96 which is mounted in a support block 97 and is held in insulated relation thereto by means of an insulating bushing 98. The adjusting stud 96 is held in position by the spring 99, and the spring 99 is connected to the terminal 65 by means of the insulated wire 100. Consequently, an electrically conductive path is formed from the contact 92, through the loop 93 and the stud 96, along the spring 99, and through the wire 100 to the terminal 65.

Fig. 9 is an illustration of a portion of the device after certain adjustments have been made, and these adjustments will now be described. The contact gap between the contact 90 and the contact 92 may be easily adjusted by rotating the adjusting stud 96. The loop 93 will thereby rotate about the stud axis, and the lower end of the contact 92 will move in relation to the leg 91 of the contact 90. A feature of an adjustment of this type is that the contact gap may be varied over a wide range without affecting the amount of flexibility in the contact 92. To adjust this flexibility, loop 93 may be twisted in relation to its end portion 95. This will cause the end portion 94 to exert pressure on the contact 92, and since the contact 92 has the upper end thereof rigidly affixed to the loop 93, this contact will bend and the amount of flexibility therein will increase. The flexibility in the contact 92 may be reduced in a similar manner by twisting the loop 93 in the opposite direction. Consequently, it will be apparent that when the contact 92 engages the contact 90 the yielding engagement therebetween can be readily altered by twisting the loop 93. By means of the two simple adjustments described above, the operating characteristics of this embodiment can be quickly and easily adapted to meet the requirements of a particular circuit or apparatus and this has been accomplished primarily by means of a configuration of parts that is easily and quickly manufactured and is particularly adapted to a device of exceedingly small size.

When an energizing current of the proper frequency is applied to the terminals 63 and 64, the winding 71 will produce an electromagnetic flux that will modulate the permanent magnetic flux and cause the tines 86 and 87 to vibrate. The movement of the tine 86 will close the gap between the contact 90 and the contact 92, thereby producing an electrically conductive path from the terminal 65, along the wire 100 and the spring 99 to the adjusting stud 96, from the adjusting stud 96 to the loop 93 and the attached contact 92, from the contact 92 to the contact 90, from the contact 90 to the tine 86, along the tine 86 to the spacer block 88 and the frame member 81, and then through the wire 101 to the terminal 66. When the current in the winding 71 is removed, the tines 86 and 87 will return to their initial position and thereby will disengage the contact 90 from the contact 92.

It is apparent that the various modifications of the component parts of the disclosed embodiments of the invention are, in many instances, interchangeable with each other, that certain of the mechanical and electrical details shown are merely illustrative of particular embodiments, and that various parts and arrangements thereof may be modified without departing from the scope and spirit of the invention.

What is claimed is:

1. An electromechanical vibrator comprising a vibratile tine, a frame member supporting said tine, a magnetic structure including a permanent magnet and including a core member extending from said magnet and having a pole-piece portion in operable relation to said tine, energizing means for vibrating said tine, a contact member having a portion thereof adapted for yielding engagement with said vibrating tine, first adjustment means for positioning said contact member in operable relation to said tine, and second adjustment means for altering the yielding force exerted between said contact member and said tine during said engagement.

2. An electromechanical vibrator comprising a vibratile tine, a relatively flexible frame member supporting said tine, a magnetic structure including a permanent magnet extending in a direction substantially perpendicular to the longitudinal direction of said tine and including an elongated core member extending from said magnet and having a pole-piece portion in operable relation to said tine, an energizing winding disposed about said core member, a flexible contact member having a portion thereof adapted for yielding engagement with said vibrating tine, first adjustment means for positioning said contact member in operable relation to said tine, and second adjustment means for altering the yielding force exerted between said contact member and said tine during said engagement.

3. An electromechanical vibrator comprising a flat vibratile tine arranged when vibrated to flex in a plane perpendicular to the plane of said tine, an elongated frame member having a portion thereof lying in a plane parallel to the flexing plane of said tine, said frame member being relatively flexible to bending in a direction perpendicular to the flexing plane of said tine and relatively rigid to bending in a direction parallel to the flexing plane of said tine, one end of said frame member fixedly supporting said tine, a magnetic structure including a permanent magnet extending in a direction substantially perpendicular to the longitudinal direction of said tine and including an elongated core member extending from said magnet and having a pole-piece portion in operable relation to said tine, an energizing winding disposed about said core member, a first contact mounted on said tine, a second contact adapted for yielding engagement with said first contact, first adjustment means for controlling the separation of said contacts, and second adjustment means supported by said frame member for altering the yielding force exerted between said contacts during said engagement.

4. An electromechanical vibrator comprising a pair of parallel separated tines arranged when vibrated to flex in the same plane, an elongated frame member having a portion thereof lying in a plane parallel to the flexing plane of said tines, said frame member being relatively flexible to bending in a direction perpendicular to the flexing plane of said tines and relatively rigid to bending in a direction parallel to the flexing plane of said tines, one end of said frame member fixedly supporting said tines, a magnetic structure including an elongated permanent magnet extending in a direction substantially perpendicular to the longitudinal direction of said tines and including an elongated core member extending from said magnet and having a pole-piece portion in operable relation to said tines, an energizing winding disposed about said core member, a first contact mounted on one of said tines, a second contact mounted adjacent said frame member and adapted for yielding engagement with said first contact, first adjustment means for controlling the separation of said contacts, and second adjustment means for altering the yielding force exerted between said contacts during said engagement.

5. An electromechanical vibrator comprising a pair of electrically conducting flat tines lying in different parallel planes and electrically interconnected at one set of adjacent ends and free at the other set of adjacent ends, an elongated channel frame member longer than said tines and having its end portions in different parallel planes perpendicular to the planes of said tines, said frame member being relatively flexible to bending in the direction of the planes of said tines and relatively rigid to bending in the direction of the planes of said end portions, one end of said frame member fixedly supporting and electrically connecting to the said one set of adjacent ends of said tines, the other end of said frame member being separated from said tines, a magnetic structure including an elongated permanent magnet extending in a direction substantially perpendicular to the longitudinal direction of said tines and including an elongated core member extending from said magnet and having a pole-piece portion in operable relation to said tines, an energizing winding disposed about said core member, a first contact mounted on one of said tines near the free end thereof, a second contact insulatedly supported by said frame member and having one end thereof adapted for momentary yielding engagement with said first contact, first adjustment means for controlling the separation of said contacts, and second adjustment means for altering the yielding force exerted between said contacts during said engagement.

6. An electromechanical vibrator comprising a vibratile tine, a frame member supporting said tine, a magnetic structure including a permanent magnet extending in a direction substantially perpendicular to the longitudinal direction of said tine and including an elongated core member having one end thereof adjacent said permanent magnet and having the other end forming a pole-piece in operable relation to said tine, an energizing winding disposed about said core member between the said one end and the said pole-piece end thereof, a flexible contact member having a portion thereof adapted for yielding engagement with said vibrating tine, first adjustment means for positioning said contact member in operable relation to said tine, and second adjustment means for altering the yielding force exerted between said contact member and said tine during said engagement.

7. An electromechanical vibrator comprising a vibratile tine, a relatively flexible frame member supporting said tine, a magnetic structure including an elongated permanent magnet having its ends of like polarity and its central area of the opposite polarity, said magnet extending in a direction substantially perpendicular to the longitudinal direction of said tine, and including an elongated core member having one end thereof perpendicularly adjacent said permanent magnet at said central area and having the other end forming a pole-piece in operable relation to said tine, an energizing winding disposed about said core member between the said one end and the said pole-piece end thereof, a first contact mounted on said tine, a second contact mounted adjacent said frame member and adapted for yielding engagement with said first contact, first adjustment means for controlling the separation of said contacts, second adjustment means for altering the yielding force exerted between said contacts during said engagement, and a magnetic cover encasing the entire structure of said vibrator and comprising a part of the magnetic return flux path for said magnetic structure.

8. An electromechanical vibrator comprising a pair of parallel separated tines arranged when vibrated to flex in the same plane, a relatively flexible frame member supporting said tines, a magnetic structure including an elongated permanent magnet having its ends of like polarity and having its central area of the opposite polarity, said magnet extending in a direction substantially perpendicular to the longitudinal direction of said tines, and including an elongated core member having one end thereof adjacent said permanent magnet at said central area and having the other end forming a pole-piece in operable relation to said tines, an energizing winding disposed about said core member between the said one end and the said pole-piece end thereof, a first contact mounted on one of said tines, a second contact adapted for yielding engagement with said first contact, first adjustment means for controlling the separation of said contacts, and second adjustment means for altering the yielding force exterted between said contacts during said engagement.

9. An electromechanical vibrator comprising a flat vibratile tine, a frame member supporting said tine, said frame member being relatively flexible to bending in the direction of the plane of said tine and relatively rigid to bending in a direction perpendicular to the plane of said tine, a magnetic structure including an elongated permanent magnet having its ends of like polarity and its central area of the opposite polarity, said magnet extending in a direction substantially perpendicular to the longitudinal direction of said tine, and including an elongated core member having one end thereof adjacent said permanent magnet at said central area and having the other end forming a pole-piece in operable relation to said tine, an energizing winding disposed about said core member between the said one end and the said pole-piece end thereof, a first contact mounted on said tine, a second contact adapted for yielding engagement with said first contact, first adjustment means for controlling the separation of said contacts, and second adjustment means for altering the yielding force exerted between said contacts during said engagement.

10. An electromechanical vibrator comprising a vibratile tine, a frame member supporting said tine, a magnetic structure including a permanent magnet and including a core member extending from said magnet and having a pole-piece portion in operable relation to said tine, energizing means for vibrating said tine, a flexible elongated contact member having one end thereof adapted for yielding engagement with said vibrating tine, first adjustment means supported by said frame member and having a cam portion engageable by said contact member at a point intermediate the ends of said contact member for positioning said contact member in operable relation to said tine, and second adjustment means mounted on said frame member and secured to the other end of said contact member for adjusting the yielding force exerted between said contact member and said tine during said engagement.

11. An electromechanical vibrator comprising a flat vibratile tine, a frame member supporting said tine, said frame member being relatively flexible to bending in the direction of the plane of said tine and relatively rigid to bending in a direction perpendicular to the plane of said tine, a magnetic structure including an elongated permanent magnet having its ends of like polarity and its central area of the opposite polarity, said magnet extending in a direction substantially perpendicular to the longitudinal direction of said tine, and including an elongated core member having one end thereof adjacent said permanent magnet at said central area and having the other end forming a pole-piece in operable relation to said tine, an energizing winding disposed about said core member between the said one end and the said pole-piece end thereof, a first contact mounted on said tine, a second contact adapted for yielding engagement with said first contact, first adjustment means supported by said frame member and having a cam portion engageable by said second contact for controlling the separation of said contacts, and second adjustment means mounted on said frame member for altering the yielding force exerted between said contacts during said engagement.

12. An electromechanical vibrator comprising a vibratile tine, a frame member supporting said tine, a magnetic structure including a permanent magnet and including a core member extending from said magnet and having a pole-piece portion in operable relation to said tine, energizing means for vibrating said tine, a contact member having a portion thereof adapted for yielding engagement with said vibrating tine, first adjustment means rotatably mounted on said frame member for rotating said contact member in spaced relation to said tine and second adjustment means supported by said first adjustment means for altering the yielding force exerted between said contact member and said tine during said engagement.

13. An electromechanical vibrator comprising a vibratile tine, a frame member supporting said tine, a magnetic structure including a permanent magnet and including a core member extending from said magnet and having a pole-piece portion in operable relation to said tine, energizing means for vibrating said tine, an elongated contact member having a portion thereof adapted for yielding engagement with said vibrating tine, first adjustment means rotatably mounted on said frame member for rotating said contact member about a point intermediate the ends of said contact member in spaced relation to said tine, and second adjustment means supported by said first adjustment means and having a flexible loop portion for altering the yielding force exerted between said contact member and said tine during said engagement.

14. An electromechanical vibrator comprising a vibratile tine, a frame member supporting said tine, a magnetic structure including a permanent magnet and including a core member extending from said magnet and having a pole-piece portion in operable relation to said tine, energizing means for vibrating said tine, an elongated contact member having one end thereof adapted for yielding engagement with said vibrating tine, an adjusting stud rotatably mounted on said frame member for rotating said one end of said contact member about a point intermediate the ends of said contact member in spaced relation to said tine and a flexible loop supported by said adjusting stud, said loop having a curved portion rigidly secured to the other end of said contact member and having a substantially straight end portion disposed in a direction substantially perpendicular to the direction of said contact member for adjusting the yielding force exerted between said contact member and said tine during said engagement.

15. An electromechanical vibrator comprising a flat vibratile tine, a frame member supporting said tine, said frame member being relatively flexible to bending in the direction of the plane of said tine and relatively rigid to bending in a direction perpendicular to the plane of said tine, a magnetic structure including an elongated permanent magnet having its ends of like polarity and its central area of the opposite polarity, said magnet extending in a direction substantially perpendicular to the longitudinal direction of said tine, and including an elongated core member having one end thereof adjacent said permanent magnet at said central area and having the other end forming a pole-piece in operable relation to said tine, an energizing winding disposed about said core member between the said one end and the said pole-piece end thereof, a first contact mounted on said tine, a second elongated contact adapted for yielding engagement with said first contact, first adjustment means rotatably mounted on said frame member for rotating said second contact about a point intermediate the ends of said second contact in spaced relation to said tine and second adjustment means supported by said first adjustment means and having a flexible loop portion for altering the yielding force exerted between said contacts during said engagement.

16. An electromechanical vibrator comprising a flat vibratile tine, a frame member supporting said tine, said frame member being relatively flexible to bending in the direction of the plane of said tine and relatively rigid to bending in a direction perpendicular to the plane of said tine, a magnetic structure including an elongated permanent magnet having its ends of like polarity and its central area of the opposite polarity, said magnet extending in a direction substantially perpendicular to the longitudinal direction of said tine, and including an elongated core member having one end thereof adjacent said permanent magnet at said central area and having the other end forming a pole-piece in operable relation to said tine, an energizing winding disposed about said core member between the said one end and the said pole-piece end thereof, a first contact mounted on said tine, a second elongated contact having one end thereof adapted for momentary yielding engagement with said first contact, an adjusting stud rotatably mounted on said frame member for rotating said one end of said second contact about a point intermediate the ends of said second contact in spaced relation to said tine, and a flexible loop supported by said adjusting stud, said loop having a curved portion rigidly secured to the other end of said contact member and having a substantially straight end portion disposed in a direction substantially perpendicular to the direction of said second contact for adjusting the yielding force exerted between said contacts during said engagement.

References Cited in the file of this patent

UNITED STATES PATENTS

| 322,694 | Delany | July 21, 1885 |
| 524,165 | Downes | Aug. 7, 1894 |
| 711,386 | Daft et al. | Oct. 14, 1902 |
| 821,992 | Downs | May 29, 1906 |
| 2,614,188 | Williams et al. | Oct. 14, 1952 |
| 2,678,360 | Bellis | May 11, 1954 |
| 2,698,366 | Howell | Dec. 28, 1954 |
| 2,758,173 | Riley | Aug. 7, 1956 |
| 2,789,177 | Brockway | Apr. 16, 1957 |

FOREIGN PATENTS

| 134,721 | Austria | Sept. 25, 1933 |
| 334,196 | France | Oct. 14, 1903 |